United States Patent [19]

Phillips, Jr.

[11] 4,215,344

[45] Jul. 29, 1980

[54] MULTIPLE CHANNEL ELECTRONIC COUNTERMEASURES RADAR RECEIVER

[75] Inventor: Calvert F. Phillips, Jr., Annapolis, Md.

[73] Assignee: The United States of America as represented by the Secretary of the Air Force, Washington, D.C.

[21] Appl. No.: 324,138

[22] Filed: Nov. 15, 1963

[51] Int. Cl.$^2$ .............................................. G01S 7/36
[52] U.S. Cl. .................................................. 343/18 E
[58] Field of Search ................. 343/18, 100.12, 18 E; 325/473, 474, 477, 479, 489, 324

Primary Examiner—Malcolm F. Hubler
Attorney, Agent, or Firm—Joseph E. Rusz; Eugene J. Pawlikowski

EXEMPLARY CLAIM

1. A multiple channel electronic countermeasures radar receiving system comprising: source means for supplying periodic echo pulses beat to the intermediate frequency of the system and combined with jamming noise of variable frequency distribution, first receiver means fed by said source means and having a predetermined bandwidth centered on the intermediate frequency for limiting sharply to a fairly constant level signals from said source means which exceed a given amplitude, second receiver means fed by said source means and tuned to said intermediate frequency for limiting according to a logarithmic expression signals from said source means which exceed said given amplitude, frequency selective means included in said first receiver means for generating a first voltage defining random noise distribution at frequencies extending over the range of said bandwidth and generating a second voltage defining random noise distribution at frequencies offset from said intermediate frequency by a predetermined amount, video utilization means, and gate means controlled by said frequency selective means for gating the output of said first receiver means to said video utilization means in response to said first voltage and gating the output of said second receiver means to said video utilization means in response to said second voltage.

4 Claims, 2 Drawing Figures

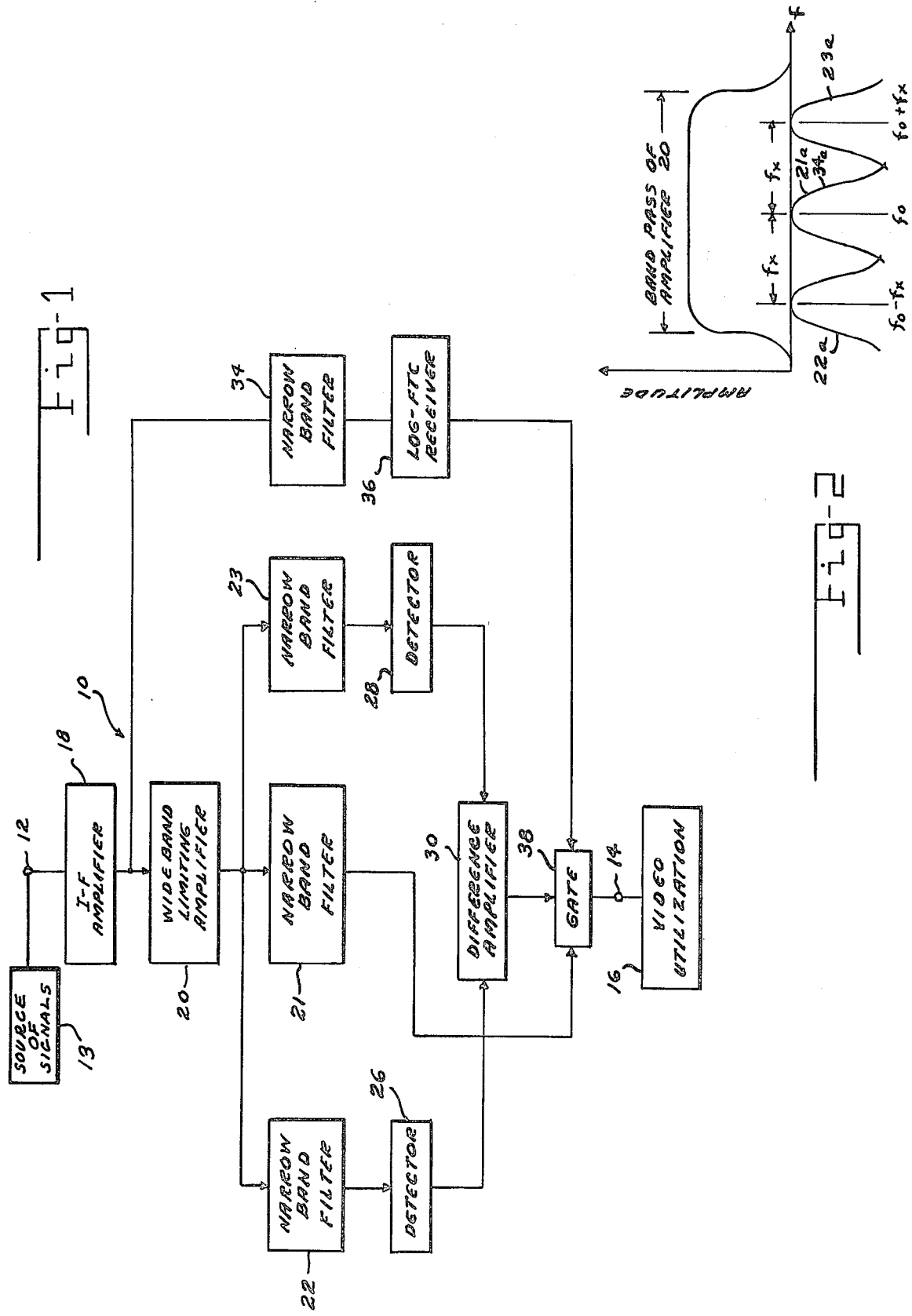

MULTIPLE CHANNEL ELECTRONIC COUNTERMEASURES RADAR RECEIVER

This invention relates to electronic countermeasures systems and, particularly, to a multiple channel anti-jamming radar receiver that distinguishes atuomatically between the noise characteristics of different jamming signals.

One very serious problem encountered in the effective operation of large search radar systems designed to operate in jamming environments is the selection of the optimum receiver for each type of jamming signal. In the majority of anti-jam search radars currently in use, optimum receiver selection is accomplished manually by an operator manning an anti-jam console. Manual selection of this nature is adequate for most situations but is inadequate for coping with onslaught jamming in which many types of jamming create a complex jamming environment when simultaneously applied.

Accordingly, an object of the invention is to provide a radar receiver with automatic receiver selection for use in jamming environments.

Another object of the invention is the provision, in a radar system, of an automatically responsive receiver selector which decreases the vulnerability of the system to enemy jamming.

A further object of the invention is to provide a radar receiving system which distinguishes from wide-sweep and off-sweep jamming and selects the receiver best adapted to minimize the effects of the jamming.

Still a further object of the invention is the provision of an anti-jam receiver which substantially relieves the anti-jam operator of certain tasks when confronted with complex jamming.

A complete understanding of other objects, features, and advantages of the invention not specifically mentioned may be had from the following description of one embodiment thereof when taken in connection with the appended drawings, wherein:

FIG. 1 shows a functional block diagram of the multiple anti-jam receiver system of the invention; and FIG. 2 shows approximations of band pass waveforms as they would appear in the circuit of FIG. 1.

Referring now to FIG. 1, the multiple radar receiver of the invention, generally referenced 10, includes an input terminal 12 coupled to a source of signals 13 which supplies periodic echo pulses at intermediate frequency rather than radio frequency, and an output terminal 14 to which may be connected a suitable video utilization means 16, such as a video amplifier strip, cathode ray tube display, or the like. One of more stages of i-f amplification are represented in FIG. 1 by i-f amplifier 18. It will be understood that in the absence of a jamming environment the i-f echo returns will ordinarily be gated not to input terminal 12 but to other more conventional radar receivers as, for example, to MTI coherent and non-coherent receivers. These latter receivers are known to offer certain operational advantages in jam-free environments. However, when jamming is encountered, the i-f echo returns will be conducted from source of signal 13 to input terminal 12, by suitable manually-directed apparatus not shown.

The output of amplifier 18 is directed over two parallel branches the video outputs of which are fed to output terminal 14 one at a time. The first branch includes a wideband limiting amplifier 20, three narrow-band filters 21, 22, and 23 fed by amplifier 20, two detectors 26 and 28 to which the outputs of filters 22 and 23 are applied, respectively, and a difference amplifier 30. Amplifier 20 has a bandwidth as shown in FIG. 2. Approximations of the waveforms of band-pass filters 21, 22, and 23 are represented by the curves 21a, 22a, and 23a, respectively. Filter 21 is centered on the frequency $f_o$, where $f_o$ is the intermediate frequency of the signals presented at input terminal 12. Filters 22 and 23 have substantially the same bandwidth as filter 21 and are staggered in frequency, filter 22 being tuned below the mean signal frequency by an amount $f_x$, and filter 23 being tuned above the mean signal frequency by an equal amount, where $f_x$ equals the number of cycles per second the peaks of filters 22 and 23 are removed from the center frequency $f_o$. It will be seen that the three filters 21, 22, and 23 are peaked well within the bandwidth of amplifier 20.

An intermediate frequency that would be appropriate to a system of FIG. 1 is say, 30 Mc, since this frequency is in common use in many radar sets. For purposes of illustration, it will be assumed that amplifier 20 has a fixed bandwidth of 4 Mc. The lower and upper limiting frequencies of amplifier 20 are 28 Mc and 32 Mc, respectively. No particular significance is attached to the specific value enumerated for the intermediate frequency since, of course, those skilled in the art will understand that a higher or lower frequency might well be chosen instead.

Detectors 26 and 28 are identical and may include an ordinary amplifier tube biased approximately to cutoff for plate detection. Signal voltages at the frequencies $f_o - f_x$ and $f_o + f_x$ emerging from filters 22 and 23, respectively, applied to the grids of such tubes, will give pulses of plate current on the positive half cycles and no current on the negative half cycles. Through suitable reactive component filtering in the plate circuit the average resultant plate current is then dependent on the average amplitude of the applied signal. This current develops a substantially time-invariant output which serves as the input voltage to difference amplifier 30.

Difference amplifier 30 may take the form of a conventional differentiating amplifier which, in response to the difference between two input voltages applied thereto, produces an output voltage proportional to the difference in input voltage and effectively generates a differential output equalling zero for input voltages of the same value.

The limiting amplifier 20 when taken together with filter 21 may be considered as a limiting receiver of the type which sharply limits input signals which exceed a given amplitude. A standard limiting receiver preferred for use in the invention embodiment is the conventional Dicke-fix receiver which, as well known in the art, is eminently suited for reducing excessive amplitude variations contributed by certain forms of jamming among which are wide-band noise, rapidly swept noise or CW, pulse jamming or the like. Thus, against jamming signals of the type which tend to frequency sweep periodically or continuously, a very high degree of anti-jam protection is assured by employing the receiver path including amplifier 20. For that form of jamming in which the distribution of the jamming power is concentrated for relatively long intervals at a point in the spectrum causing intermediate frequencies removed considerably to either side of the intermediate frequency of the system, another form of limiting receiver is preferred since, in the normal course of limiting the jamming signals, the Dicke-fix receiver will limit the on-frequency target returns as well. Because of such localized concentration of the interference at either side of the intermediate frequency, this latter form of jamming is generally referred to as off-frequency jamming, a definition which will be followed as the description proceeds.

Accordingly, the second branch leading from input terminal 12 includes a narrow-band filter 34 coupled to feed a Log-FTC (fast time constant) receiver 36 having a bandwidth centered on the frequency $f_o$. Also, the center frequency and bandwidth characteristics of filters 34 and 21 are alike, as shown by the superposed curves 21a and 34a in FIG. 2. In the preferred embodiment, receiver 36 may be of the type known which has limiting characteristics linear for small signals and logarithmic for large signals. Hence, it will be understood that whereas amplifier 20 will reduce input signals exceeding a certain amplitude to a fairly constant level input signals of the same amplitude are reduced by Log-FTC receiver 36 according to logarithmic expression.

The outputs of filter 21 included in the above-described first branch and the output of receiver 36 in the second branch are applied to a gate circuit 38 of any conventional design. Gate circuit 38 is controlled by difference amplifier 30 and is so constructed and arranged that, with no output voltage from difference amplifier 30, the gate circuit established connects filter 21 to output terminal 14, and that upon an output voltage from difference amplifier 30 the output of receiver 36 is coupled to terminal 14. It will be understood that the operation of gate circuit 38 in response to excitation by difference amplifier 30 is such that only one of the two parallel branches may be connected between terminals 12 and 14 at any one time.

In operation, let it be assumed that one of the forms of wide-band noise, rapidly swept noise or CW, pulse jamming or the like is encountered, so that the bandwidth of amplifier 20 is completely flooded with a distribution of random noise of substantially even amplitude. Simultaneous low-pass and high-pass response of filters 22 and 23, respectively, will cause direct current input voltages of essentially equal amplitude to be applied to difference amplifier 30. Any output voltage of difference amplifier 30 therefore vanishes. Under this condition, gate circuit 38 internally establishes a connection between filter 21 and output terminal 14, thereby introducing the limiting receiver channel to cope with the complex jamming environment.

Let it now be assumed that jamming of the off-frequency type is encountered and, additionally, that the jamming power contributes to random noise frequencies in the neighborhood of the frequency $f_o+f_x$. It follows that such a condition defines non-simultaneous low-pass and high-pass response of filters 22 and 23, respectively. Accordingly, whereas the signals at the frequency $f_o+f_x$ will result in an output from detector 28, the output of detector 26 will be zero due to the rejection by filter 22 of the upper frequencies. The disparity between the output voltages of filters 22 and 23 is changed to an output voltage from difference amplifier 30 which is applied to gate circuit 38. In response, gate circuit 38 disconnects terminal 14 from filter 21 and simultaneously closes a circuit to Log-FTC receiver 36.

It will be appreciated that for off-frequency jamming causing random noise in the vicinity of the center frequency of filter 22, the roles of the filters 22 and 23 will be reversed in a manner believed clear and thereby, by the action of difference amplifier 30 on gate circuit 38, similarly automatically couple Log-FTC receiver 36 to output terminal 14.

Although only one embodiment of the invention has been illustrated and described, it will be obvious to those skilled in the art that various changes and modifications can be made therein without departing from the spirit of the invention or the scope of the appended claims.

I claim:

1. A multiple channel electronic countermeasures radar receiving system comprising: source means for supplying periodic echo pulses beat to the intermediate frequency of the system and combined with jamming noise of variable frequency distribution, first receiver means fed by said source means and having a predetermined bandwidth centered on the intermediate frequency or limiting sharply to a fairly constant level signals from said source means which exceed a given amplitude, second receiver means fed by said source means and tuned to said intermediate frequency for limiting according to a logarithmic expression signals from said source means which exceed said given amplitude, frequency selective means included in said first receiver means for generating a first voltage defining random noise distribution at frequencies extending over the range of said bandwidth and generating a second voltage defining random noise distribution at frequencies offset from said intermediate frequency by a predetermined amount, video utilization means, and gate means controlled by said frequency selective means for gating the output of said first receiver means to said video utilization means in response to said first voltage and gating the output of said second receiver means to said video utilization means in response to said second voltage.

2. A multiple channel electronic countermeasures radar receiving system comprising: source means for supplying periodic echo pulses beat to the intermediate frequency of the system and combined with jamming noise of variable frequency distribution, first receiver means fed by said source means for limiting sharply to a fairly constant level signals from said source means which exceed a given amplitude; said first receiver means having a predetermined bandwidth which is centered on said intermediate frequency, first and second filters fed by said first receiver means and tuned to different frequencies below and above said intermediate frequency, respectively, said different frequencies being displaced from said intermediate frequency by the same amount, said first and second filters each having a bandwidth which is substantially less than said predetermined bandwidth, and the pass bands of said first and second filters being included within the pass band of said first receiver means, difference amplifier means receiving input voltages proportional to the output signals of said filters for generating a first voltage during intervals defining simultaneous low-pass and high-pass response of said first and second filters, respectively, and a second voltage during intervals defining non-concurrent response of said filters, second receiving means fed by said source means and tuned to said intermediate frequency for limiting according to a logarithmic expression signals from said source means which exceed said given amplitude, video utilization means, and gating means controlled by said first voltage to gate the output of said first receiver means to said video utilization means and controlled by said second voltage to gate the output of said second receiver to said video utilization means.

3. A multiple channel electronic countermeasures radar receiving system comprising: input and output terminals, source means for supplying to said input terminal intermediate frequency echo pulses combined with jamming noise of random frequency distribution, a wideband limiting amplifier coupled to said input terminal having a predetermined bandwidth centered on the intermediate frequency, said amplifier having limiting characteristics which suppress to a fairly constant level input signals which exceed a given amplitude, a first filter fed by said amplifier tuned to said intermediate frequency and having a bandwidth which is substantially less than said predetermined bandwidth, second and third filters fed by said amplifier and tuned to different frequencies below and above said intermediate frequency, respectively, said different frequencies being displaced from said intermediate frequency by the same amount, said second and third filters each having a bandwidth which is substantially less than said predetermined bandwidth, and the pass bands of said second and third filters being included within the pass band of said amplifier, detector means coupled to each of said second and third filters for converting time-variant output signals therefrom into direct current voltages, a difference amplifier fed by said detector means for generating an output voltage proportional to the difference in the amplitudes of voltages emerging from said detector means and generating a differential output equalling zero for output voltages of the same value, a fourth filter tuned to the intermediate frequency coupled to said input terminal, a Log-FTC receiver fed by said fourth filter having limiting characteristics according to a logarithmic expression, video utilization means, coupled to said output terminal, and gate means controlled by said difference amplifier for coupling said first filter and said Log-FTC receiver to said output terminal in response to said zero and differential output voltages, respectively.

4. A multiple channel electronic countermeasures radar receiving system comprising: input and output terminals, source means for supplying to said input terminal intermediate frequency echo pulses combined with jamming noise of random frequency distribution, an intermediate frequency amplifier coupled to said input terminal, a wideband limiting amplifier coupled to said intermediate frequency amplifier having a predetermined bandwidth centered on the intermediate frequency, said limiting amplifier having limiting characteristics which suppress to a constant level input signals thereto which exceed a given amplitude, a first filter fed by said limiting amplifier tuned to the intermediate frequency and having a bandwidth which is centered on said intermediate frequency, second and third filters fed by said limiting amplifier and tuned to different frequencies below and above said intermediate frequency, respectively, said different frequencies being displaced from said intermediate frequency by the same amount, said second and third filters each having a bandwidth which is substantially less than said predetermined bandwidth, and the pass bands of said second and third filters being included within the pass band of said limiting amplifier, detector means coupled to each of said second and third filters for converting time-variant output signals therefrom into direct current voltages, a difference amplifier fed by said detector means for generating an output voltage at a time only when the input voltages applied thereto differ in amplitude, a fourth filter tuned to the intermediate frequency coupled to the output of said intermediate frequency amplifier, a LOG-FTC receiver fed by said fourth filter having limiting characteristics according to a logarithmic expression, video utilization means coupled to said output terminal, and gate means controlled by said difference amplifier for coupling said LOG-FTC receiver to said output terminal at said time and for coupling said first filter to said output terminal when the input voltages to said difference amplifier are equal in amplitude.

* * * * *